US010999384B2

(12) United States Patent
Artz, Jr. et al.

(10) Patent No.: US 10,999,384 B2
(45) Date of Patent: *May 4, 2021

(54) METHOD AND SYSTEM FOR IDENTIFYING WEBSITE VISITORS

(71) Applicant: Open Text SA ULC, Halifax (CA)

(72) Inventors: John C. Artz, Jr., Woburn, MA (US); William H. Bender, Norwich, VT (US); Heeren Pathak, Woburn, MA (US)

(73) Assignee: OPEN TEXT SA ULC, Halifax (CA)

( * ) Notice: Subject to any disclaimer, the term of this patent is extended or adjusted under 35 U.S.C. 154(b) by 591 days.

This patent is subject to a terminal disclaimer.

(21) Appl. No.: 15/902,810

(22) Filed: Feb. 22, 2018

(65) Prior Publication Data

US 2018/0183888 A1 Jun. 28, 2018

Related U.S. Application Data

(63) Continuation of application No. 14/676,481, filed on Apr. 1, 2015, now Pat. No. 9,936,032, which is a
(Continued)

(51) Int. Cl.
*H04L 29/08* (2006.01)
*H04L 29/06* (2006.01)
*H04L 12/26* (2006.01)

(52) U.S. Cl.
CPC ............. *H04L 67/22* (2013.01); *H04L 43/10* (2013.01); *H04L 63/10* (2013.01); *H04L 67/02* (2013.01); *H04L 67/306* (2013.01); *H04L 67/42* (2013.01)

(58) Field of Classification Search
CPC ........ H04L 67/22; H04L 67/42; H04L 67/306; H04L 67/02; H04L 43/10; H04L 63/10
See application file for complete search history.

(56) References Cited

U.S. PATENT DOCUMENTS 5,412,801 A 5/1995 de Remer et al.
5,557,717 A 9/1996 Wayner
(Continued)

OTHER PUBLICATIONS

"XSL Transformations (XSLT) Version 1.0, W3C Recommendation," Nov. 16, 1999, pp. 1-87, at http://www.w3.org/TR/1999/REC-xslt-19991116.
(Continued)

*Primary Examiner* — Oanh Duong
(74) *Attorney, Agent, or Firm* — Sprinkle IP Law Group (57) ABSTRACT

A website server computer hosting a website can identify a visitor to the website by using information provided by a visitor server computer that interacts with the visitor. The information provided by the server computer, in some embodiments, can be a combination of an IP address and characteristics of a computing device from where the visitor visits the website. In some embodiments, the IP address of the visitor server computer is used. In embodiments where the visitor may be sharing the computing device with other users, the characteristics may include at least one characteristic that is uniquely associated with the visitor. The website server computer can use a visitor identifier thus generated to start tracking the pages that the visitor requests during the session and can generate and customize pages for the visitor by using characteristics originated from the visitor.

20 Claims, 4 Drawing Sheets

Related U.S. Application Data continuation of application No. 13/752,116, filed on Jan. 28, 2013, now Pat. No. 9,021,022, which is a continuation of application No. 12/266,129, filed on Nov. 6, 2008, now Pat. No. 8,386,561, which is a continuation of application No. 10/616,408, filed on Jul. 9, 2003, now Pat. No. 7,461,120.

(60) Provisional application No. 60/394,478, filed on Jul. 9, 2002.

(56) References Cited

U.S. PATENT DOCUMENTS

| | | |
|---|---|---|
| 5,668,801 A | 9/1997 | Grunenfelder |
| 5,732,218 A | 3/1998 | Bland et al. |
| 5,796,952 A | 8/1998 | Davis et al. |
| 5,837,899 A | 11/1998 | Dickerman et al. |
| 6,014,706 A | 1/2000 | Cannon et al. |
| 6,014,707 A | 1/2000 | Miller et al. |
| 6,041,335 A | 3/2000 | Merritt et al. |
| 6,078,956 A | 6/2000 | Bryant et al. |
| 6,112,186 A | 8/2000 | Bergh et al. |
| 6,119,103 A | 9/2000 | Basch et al. |
| 6,128,663 A | 10/2000 | Thomas |
| 6,138,156 A | 10/2000 | Fletcher et al. |
| 6,144,962 A | 11/2000 | Weinberg et al. |
| 6,205,472 B1 | 3/2001 | Gilmour |
| 6,286,043 B1 | 9/2001 | Cuomo et al. |
| 6,321,206 B1 | 11/2001 | Honarvar |
| 6,393,479 B1 | 5/2002 | Glommen et al. |
| 6,430,539 B1 | 8/2002 | Lazarus et al. |
| 6,453,336 B1 | 9/2002 | Beyda et al. |
| 6,456,305 B1 | 9/2002 | Qureshi et al. |
| 6,496,824 B1 | 12/2002 | Wilf |
| 6,509,898 B2 | 1/2003 | Chi et al. |
| 6,559,882 B1 | 5/2003 | Kerchner |
| 6,606,657 B1 | 8/2003 | Zilberstein et al. |
| 6,615,305 B1 | 9/2003 | Olesen et al. |
| 6,629,136 B1 | 9/2003 | Naidoo |
| 6,640,215 B1 | 10/2003 | Galperin et al. |
| 6,732,331 B1 | 5/2004 | Alexander |
| 6,757,740 B1 | 6/2004 | Parekh et al. |
| 6,785,769 B1 | 8/2004 | Jacobs et al. |
| 6,836,773 B2 | 12/2004 | Tamayo et al. |
| 6,839,682 B1 | 1/2005 | Blume et al. |
| 6,873,984 B1 | 3/2005 | Campos et al. |
| 6,877,007 B1 | 4/2005 | Hentzel et al. |
| 6,892,238 B2 | 5/2005 | Lee et al. |
| 6,966,034 B2 | 11/2005 | Narin |
| 6,968,385 B1 | 11/2005 | Gilbert |
| 6,996,536 B1 | 2/2006 | Cofino et al. |
| 7,032,017 B2 | 4/2006 | Chow et al. |
| 7,096,271 B1 | 8/2006 | Omoigui et al. |
| 7,146,505 B1 | 12/2006 | Harada |
| 7,158,986 B1 | 1/2007 | Oliver et al. |
| 7,260,551 B2 | 8/2007 | Phillips |
| 7,401,066 B2 | 7/2008 | Beinglass et al. |
| 7,441,195 B2 | 10/2008 | Error et al. |
| 7,461,120 B1 | 12/2008 | Artz et al. |
| 7,502,994 B2 | 3/2009 | Kocol |
| 7,542,918 B2 | 6/2009 | Phillips |
| 7,603,430 B1 | 10/2009 | Artz, Jr. et al. |
| 7,627,688 B1 | 12/2009 | Artz, Jr. et al. |
| 7,676,574 B2 | 3/2010 | Glommen et al. |
| 7,680,672 B2 | 3/2010 | Olsson et al. |
| 7,792,844 B2 | 9/2010 | Error et al. |
| 7,818,206 B2 | 10/2010 | Smith et al. |
| 7,873,734 B1 * | 1/2011 | Eidelman ............ H04L 67/02 709/227 |
| 7,895,355 B2 | 2/2011 | Artz et al. |
| 7,962,603 B1 | 6/2011 | Morimoto |
| 8,073,927 B2 | 12/2011 | Artz, Jr. et al. |
| 8,291,040 B2 | 10/2012 | Artz, Jr. et al. |
| 8,386,561 B2 | 2/2013 | Artz, Jr. et al. |
| 8,578,014 B2 | 11/2013 | Artz, Jr. et al. |
| 8,606,900 B1 * | 12/2013 | Levergood ............ H04L 63/10 709/224 |
| 9,021,022 B2 | 4/2015 | Artz |
| 9,936,032 B2 * | 4/2018 | Artz, Jr. ............ H04L 67/42 |
| 2001/0037321 A1 | 11/2001 | Fishman et al. |
| 2002/0029275 A1 | 3/2002 | Selgas |
| 2002/0057675 A1 | 5/2002 | Park |
| 2002/0062223 A1 | 5/2002 | Waugh |
| 2002/0065938 A1 | 5/2002 | Jungck |
| 2002/0091755 A1 | 7/2002 | Narin |
| 2002/0095322 A1 | 7/2002 | Zarefoss |
| 2002/0103664 A1 | 8/2002 | Olsson et al. |
| 2002/0107841 A1 | 8/2002 | Hellerstein et al. |
| 2002/0112082 A1 | 8/2002 | Ko et al. |
| 2002/0128925 A1 | 9/2002 | Angeles |
| 2002/0129381 A1 | 9/2002 | Barone et al. |
| 2002/0133450 A1 | 9/2002 | Deming |
| 2002/0143925 A1 | 10/2002 | Pricer et al. |
| 2002/0150123 A1 | 10/2002 | Ro |
| 2002/0161673 A1 | 10/2002 | Lee et al. |
| 2002/0178169 A1 | 11/2002 | Nair et al. |
| 2002/0193114 A1 | 12/2002 | Agrawal et al. |
| 2003/0018783 A1 | 1/2003 | Bos et al. |
| 2003/0018827 A1 | 1/2003 | Guthrie et al. |
| 2003/0088716 A1 | 5/2003 | Sanders |
| 2003/0154184 A1 | 8/2003 | Chee et al. |
| 2003/0154244 A1 | 8/2003 | Zellers |
| 2003/0190649 A1 | 10/2003 | Aerts et al. |
| 2003/0202509 A1 | 10/2003 | Miyano et al. |
| 2003/0212594 A1 | 11/2003 | Hogan |
| 2003/0236892 A1 | 12/2003 | Coulombe |
| 2004/0098229 A1 | 5/2004 | Error et al. |
| 2004/0205489 A1 | 10/2004 | Bogat |
| 2004/0215599 A1 | 10/2004 | Apps et al. |
| 2005/0102292 A1 | 5/2005 | Tamayo et al. |
| 2006/0271989 A1 | 11/2006 | Glaser et al. |
| 2009/0172159 A1 | 7/2009 | Kocol |
| 2015/0207892 A1 | 7/2015 | Artz |

OTHER PUBLICATIONS

Cabena, Peter et al., "Intelligent Miner for Data Applications Guide," Mar. 1999, First Edition, 174 pgs., IBM RedBook #SG24-5252-00, IBM, San Jose, CA, at http://www.redbooks.ibm.com.

Cataldo, Paul, "DataSage Releases netCustomer, the 1st Individualization Solution for E-Commerce," DataSage News and Events, Aug. 2, 1999, 3 pgs., DataSage, Inc. at http://www.webarchive.org/web/20000309102746/www.datasage.com/news/990802netCust_La . . . .

"Retail Data Mining Executive Overview," Executive Overview—Retail, Dec. 1998, 7 pgs., DataSage, Inc. at http://web.archive.org/web/19980129012944/www.datasage.com/Papers/ExecOvRetail.html.

Gallant, Steve et al., "Successful Customer Relationship Management in Financial Applications," Tutorial PM-1, Sixth ACM SIGKDD Int'l Conf. on Knowledge Discovery and Data Mining, 2000, pp. 165-241, ACM Digital Library, New York, NY, ISBN:1-58113-305-7.

"Vignette Corporation to Acquire DataSage, Inc.," Vignette Press Center, Jan. 10, 2000, 3 pgs., Vignette Corporation, Austin, TX, at http://www.webarchive.org/web/20000302222039/www.vignette.com/CDA/Site/0.2091.1-1-30- . . . .

Chapman, Pete et al., "CRISP-DM 1.0, Step-by-step data mining guide," Aug. 2000, 78 pgs., SPSS Inc. at http://www.crisp-dm.org.

Web Page: Mozilla, "User-Agent Strings," last modified Aug. 13, 2005, 5 pgs. at http:www.mozilla.org/build/revised-user-agent-strings.html.

Office Action for U.S. Appl. No. 10/616,136, dated Mar. 12, 2007, 9 pgs.

Office Action for U.S. Appl. No. 10/616,107, dated Mar. 21, 2007, 9 pgs.

Office Action for U.S. Appl. No. 10/616,408, dated Jun. 6, 2007, 10 pgs.

Office Action for U.S. Appl. No. 10/616,136, dated Aug. 29, 2007, 11 pgs.

(56) References Cited

OTHER PUBLICATIONS

Office Action for U.S. Appl. No. 10/616,107, dated Sep. 11, 2007, 9 pgs.
Office Action for U.S. Appl. No. 10/616,408, dated Dec. 14, 2007, 10 pgs.
Office Action for U.S. Appl. No. 10/616,107, dated Dec. 31, 2007, 9 pgs.
Office Action for U.S. Appl. No. 10/616,136, dated Feb. 15, 2008, 10 pgs.
Office Action for U.S. Appl. No. 10/616,408, dated May 28, 2008, 12 pgs.
Office Action for U.S. Appl. No. 10/616,136, dated Aug. 19, 2008, 10 pgs.
Office Action for U.S. Appl. No. 10/616,107, dated Nov. 12, 2008, 11 pgs.
Reiss, Steven P., "Event-Based Performance Analysis," Proceedings of the 11th IEEE Int'l Workshop on Program Comprehension, 2003, 10 pgs., IEEE #1092-8138/03.
Office Action for U.S. Appl. No. 12/545,412, dated Apr. 7, 2011, 8 pgs.
Office Action for U.S. Appl. No. 12/266,129, dated Aug. 10, 2011, 17 pgs.
Office Action for U.S. Appl. No. 12/545,412, dated Oct. 28, 2010, 7 pgs.
Office Action for U.S. Appl. No. 12/266,129, dated Feb. 28, 2011, 16 pgs.
Office Action for U.S. Appl. No. 12/266,129, dated Nov. 28, 2011, 12 pgs.
Office Action for U.S. Appl. No. 13/270,941, dated Feb. 28, 2012, 6 pgs.
Office Action for U.S. Appl. No. 12/266,129, dated May 18, 2012, 12 pgs.
"Use of Cookies considered Safe," Nov. 1998, Updated Oct. 2000, at http://www.tomsarazac.com/tom/opinions/cookies.html.
Office Action for U.S. Appl. No. 13/610,128, dated Nov. 27, 2012, 10 pgs.
Office Action for U.S. Appl. No. 13/610,128, dated Mar. 21, 2013, 9 pgs.
Office Action for U.S. Appl. No. 13/752,116, dated Sep. 11, 2013, 10 pgs.
Office Action for U.S. Appl. No. 13/752,116, dated Mar. 20, 2014, 10 pgs.
Office Action for U.S. Appl. No. 13/752,116, dated Aug. 26, 2014, 13 pgs.
Office Action for U.S. Appl. No. 14/676,481, dated Aug. 3, 2015, 11 pgs.
Office Action for U.S. Appl. No. 14/676,481, dated Feb. 5, 2016, 11 pgs.
Office Action for U.S. Appl. No. 14/676,481, dated Jun. 29, 2016, 12 pgs.
Office Action for U.S. Appl. No. 14/676,481, dated Jan. 4, 2017, 11 pgs.
Office Action for U.S. Appl. No. 14/676,481, dated May 17, 2017, 11 pgs.
Notice of Allowance for U.S. Appl. No. 14/676,481, dated Nov. 17, 2017, 2 pgs.

\* cited by examiner

METHOD AND SYSTEM FOR IDENTIFYING WEBSITE VISITORS

CROSS-REFERENCE TO RELATED APPLICATIONS

This is a continuation of, and claims a benefit of priority from U.S. patent application Ser. No. 14/676,481 filed Apr. 1, 2015, entitled "METHOD AND SYSTEM FOR IDENTIFYING WEBSITE VISITORS," which is a continuation of, and claims priority from U.S. patent application Ser. No. 13/752,116, filed Jan. 28, 2013, now U.S. Pat. No. 9,021,022, entitled "METHOD AND SYSTEM FOR IDENTIFYING WEBSITE VISITORS," which is a continuation of, and claims priority from U.S. patent application Ser. No. 12/266,129, filed Nov. 6, 2008, now U.S. Pat. No. 8,386,561, entitled "METHOD AND SYSTEM FOR IDENTIFYING WEBSITE VISITORS," which is a continuation of, and claims priority from U.S. patent application Ser. No. 10/616,408, filed Jul. 9, 2003, now U.S. Pat. No. 7,461,120, entitled "METHOD AND SYSTEM FOR IDENTIFYING A VISITOR AT A WEBSITE SERVER BY REQUESTING ADDITIONAL CHARACTERISTIC OF A VISITOR COMPUTER FROM A VISITOR SERVER," which claims a benefit of priority from Provisional Application No. 60/394,478, filed Jul. 9, 2002, entitled "SYSTEM AND METHOD FOR SITE VISITOR IDENTIFICATION." This application relates to U.S. patent application Ser. No. 10/616,107, filed Jul. 9, 2003, now U.S. Pat. No. 7,603,430, entitled "SYSTEM AND METHOD OF ASSOCIATING EVENTS WITH REQUESTS," and Ser. No. 10/616,136, filed Jul. 9, 2003, entitled "METHOD AND SYSTEM FOR DETECTING GAPS IN A DATA STREAM." All applications listed in this paragraph are assigned to the current assignee hereof and are incorporated herein by reference.

FIELD OF THE INVENTION

This invention relates in general to the operation of a network site and, more particularly, to identification of visitors to the network site.

DESCRIPTION OF THE RELATED ART

The number of visitors visiting a website (i.e., "visitor identification") is an important metric for most commercial sites. Investors use the metric to gauge the value of a site. Advertisers use the metric to determine what is a reasonable amount of money to pay for ads on the site. Businesses use the metric to determine their own internal return of investment for their site. Therefore, the ability to capture more accurately visitor counts can be a real competitive advantage.

Many systems (e.g., WebTrends) use only the Internet Protocol ("IP") address and end up counting multiple individual users from the same IP address as a single user. This technique of using IP addresses worked during the early days of the Internet when computers connected to the Internet typically had hardwired IP addresses and the use of Network Address Translation (NAT) gateways was minimal. As the number of IP address started running out and security concerns increased, the use of NAT gateways and dynamic IP addresses have become commonplace.

Another method of identifying visitors is through the use of cookies. A web browser on the visitor computer may be set to not allow cookies or a visitor may not want to provide information to be used to generate the cookies. Therefore, a method or system that depends on cookies may be unavailable.

SUMMARY OF THE INVENTION

A method and system can be used to identify visitors at a network site (e.g., a website) by using a combination of an address and characteristic(s) of an individual visitor computer. An example of an address can be a network address, an IP address, or the like. Examples of the characteristic of the individual visitor computer can include the type of the computer, Central Processing Unit ("CPU") identifier, operating system ("OS"), browser application and version, compatibility of the browser application with other browser applications, display size, screen resolution, locale information, installed plug-in software component(s), mimetypes supported, whether a programming language (e.g., Java) is enabled, accessories that can be activated by a browser application, or any other information that may be used in locating or generating a page for the individual visitor computer requesting the information, whether or not such information is actually used by a website server computer. The method and system is more accurate than just using an IP address, and the information used for visitor identification will not usually be blocked if cookies are unavailable.

The method and system improves the ability to identify a visitor only by using the information a website server computer regularly receives in receiving and responding to requests. From the perspective outside the website, the method and system are transparent. From the visitor's perspective, he or she does not need to complete a form or send any additional information. From the network (e.g., Internet) perspective, the load on the network does not change by using the method and system. The characteristics are routinely transmitted and may be used by a network computer in locating or generating a page corresponding to a request from the visitor computer. In an alternative embodiment, a website server computer may request more characteristics of an individual visiting computer from which the request originates, but such requests do not significantly increase traffic on network.

In one set of embodiments, a method of identifying a visitor at a network site can comprise receiving an address from a first visitor computer and a first characteristic of a second visitor computer. The method can also comprise generating a first visitor identifier using the address and the first characteristic.

In another set of embodiments, a data processing system readable medium comprising code embodied in a data processing system readable medium. The code can comprise an instruction for accessing an address from a first visitor computer and a first characteristic of a second visitor computer. The code can also comprise an instruction for generating a first visitor identifier using the address and the first characteristic.

In a further set of embodiments, a system for identifying a visitor at a network site can comprise individual visitor computers, a network site computer, and a visitor control computer. The visitor control computer can be bidirectionally coupled to the individual visitor computers and the network site computer. The visitor control computer may be configured to not provide an address of any individual visitor computer to the network site computer. The network site computer may be configured to generate a visitor identifier from an address received from the visitor control computer and a characteristic of at one of the individual visitor computers.

The foregoing general description and the following detailed description are exemplary and explanatory only and are not restrictive of the invention, as defined in the appended claims.

BRIEF DESCRIPTION OF THE DRAWINGS

The invention is illustrated by way of example and not limitation in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method and system can be used to identify visitors at a network site (e.g., a website) by using a combination of an address and characteristic(s) of an individual visitor computer. An example of an address can be a network address, an IP address, or the like. Examples of the characteristic of the individual visitor computer can include the type of the computer, CPU identifier, OS, browser application and version, compatibility of the browser application with other browser applications, display size, screen resolution, locale information, installed plug-ins, mimetypes supported, whether a programming language (e.g., Java) is enabled, accessories that can be activated by a browser application, or any other information that may be used in locating or generating a page for the individual visitor computer requesting the information, whether or not such information is actually used by a website server computer. The method and system is more accurate than just using an IP address, and the information used for visitor identification will not usually be blocked if cookies are unavailable.

The method and system improves the ability to identify a visitor only by using the information a website server computer regularly receives in receiving and responding to requests. From the perspective outside the website, the method and system are transparent. From the visitor's perspective, he or she does not need to complete a form or send any additional information. From the network (e.g., Internet) perspective, the load on the network does not need to change by using the method and system. The characteristics are routinely transmitted and may be used by a network computer in locating or generating a page corresponding to a request from the visitor computer. In an alternative embodiment, a website server computer may request more characteristics of an individual visiting computer from which the request originates, but such requests do not significantly increase traffic on network.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

The term "session" is intended to mean a period over which request(s) from a single user that is (are) typically associated with a task at a network site, such as obtaining information, ordering products, etc. A session begins when the single user makes an initial request and ends when the single user leaves the network site or when inactivity from such single user at the network site exceeds a predetermined time period (e.g., 10 minutes, an hour, etc.).

The term "software component" is intended to mean at least a portion of a computer program (i.e., a software application). Examples include a visitor identifier generator software component, a plug-in software component, or the like. Different software components may reside in the same computer program or in different computer programs on the same computer or different computers.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Figure 1:
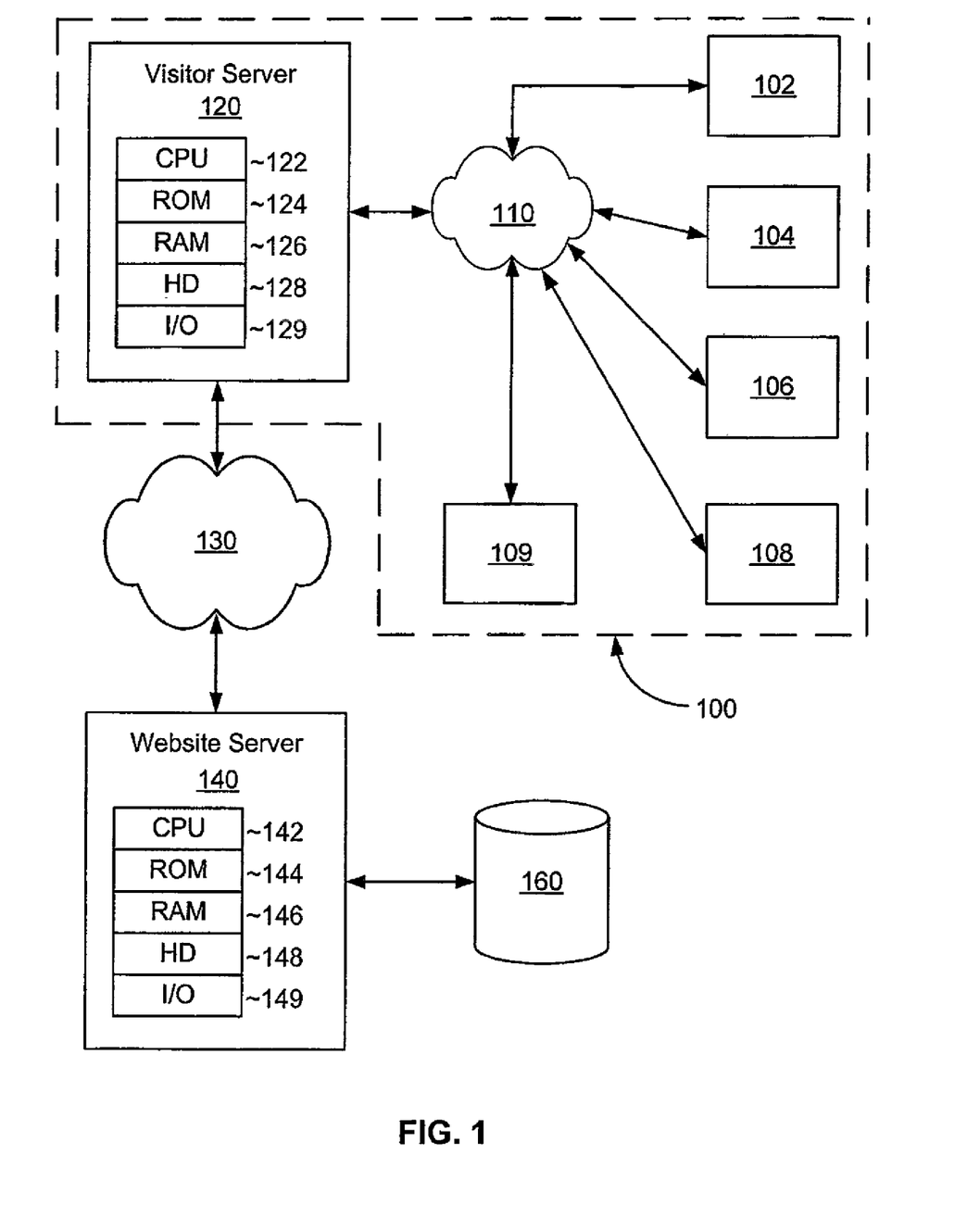
FIG. 1 includes an illustration of a network system including internally networked computers coupled to an external network server computer via an external network, wherein the system includes a software component with code having instructions in accordance with an embodiment of the invention.

Attention is now directed to an exemplary hardware configuration as shown in FIG. 1 that may be used in accordance with an embodiment of the present convention. Referring to FIG. 1, a plurality of individual visitor computers 102, 104, 106, 108, and 109 that may be bidirectionally coupled to visitor server computer 120 via internal network 110. Individual visitor computers 102, 104, 106, 108, or 109 may be client computers or connected in a peer-to-peer configuration. Individual visitor computers 102, 104, 106, 108, or 109 and visitor server computer 120 may lie within firewall 100. Visitor server computer 120 may be bidirectionally coupled to website server computer 140 via external network 130, such as the Internet. Therefore, from the perspective of website server computer 140, everything within firewall 100 may be viewed as "visitors." Website server computer 140 may be bidirectionally coupled to a database 160. The website server computer 140 is an example of a network computer. Additionally, visitor server computer 120 may act as a visitor control computer as it can act as a gateway and a security checkpoint for individual visitor computers 102, 104, 106, 108, and 109 within firewall 100.

Visitor server computer 120 can include a central processing unit ("CPU") 122, a read-only memory ("ROM")

124, a random access memory ("RAM") 126, a hard drive ("HD") or storage memory 128, and input/output device(s) ("I/O") 129. I/O 129 can include a keyboard, monitor, printer, electronic pointing device (e.g., mouse, trackball, stylus, etc.), or the like. Website server computer 140 likewise has CPU 142, ROM 144, RAM 146, HD 148, and I/O 149.

Each of the individual visitor computers 102, 104, 106, 108, and 109 may have one or more of CPU, ROM, RAM, HD, and I/O. Examples of the individual visitor computers include a personal computer, a workstation, a personal digital assistant ("PDA"), a cellular phone, a pager, and the like. More or fewer individual visitor computers may be coupled to visitor server computer 120.

Each of the computers 102, 104, 106, 108, 109, 120, and 140 is an example of a data processing system. ROM, RAM, HD, and databases can include media that can be read by the CPU of a computer. Therefore, each of these types of memories includes a data processing system readable storage medium. These memories may be internal or external to the computers.

The methods described herein may be implemented in suitable software code that may reside within ROM, RAM, or HD. The instructions in an embodiment of the invention may be contained on a data storage device, such as HD 148. A software component for carrying out the methods described herein can comprise a combination of software code elements that are embodied within a data processing system readable storage medium on HD 148. Alternatively, the instructions may be stored as software code elements on a DASD array, magnetic tape, floppy diskette, optical storage device, or other appropriate data processing system readable storage medium or device.

Figure 2:
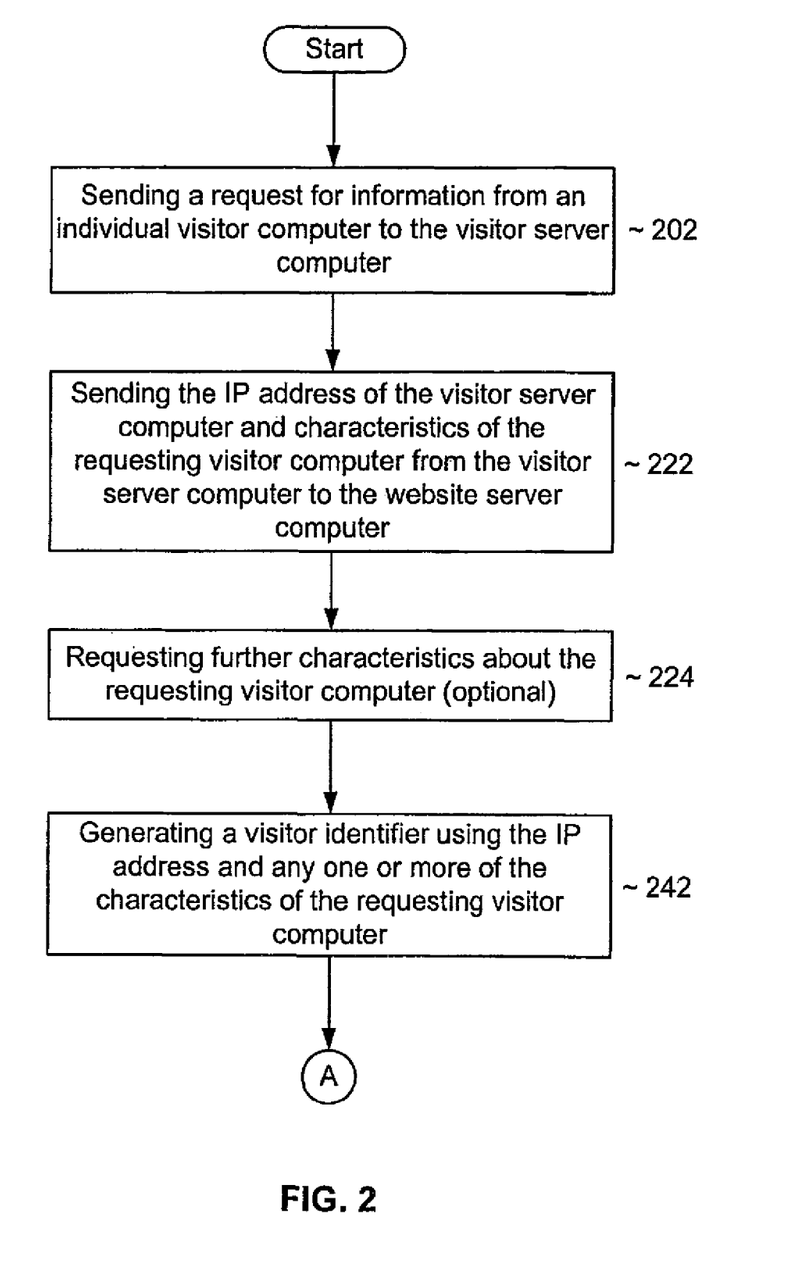
FIGS. 2-3 include a process flow diagram for identifying a visitor in accordance with an embodiment of the invention.
Figure 3:
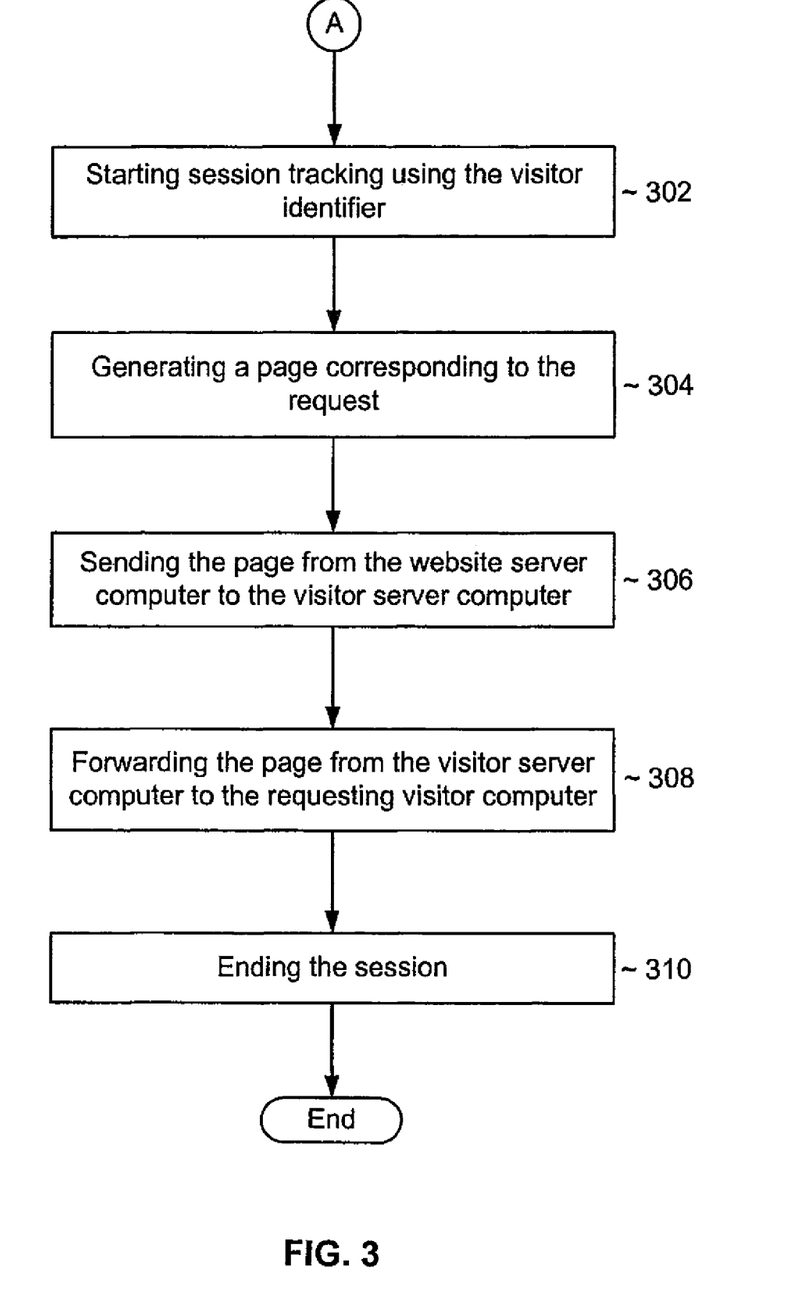

In an illustrative embodiment of the invention, the computer-executable instructions may be lines of assembly code, compiled C++, Java, or other language code. The functions of any one of the computers may be performed by a different computer. Additionally, a computer program or its software components with such code may be embodied in more than one data processing system readable storage media in more than one computer. FIGS. 2-3 include an illustration, in the form of a flowchart, of the structures and operations of such software program(s).

Communications between any of the computers can be accomplished using electronic, optical, radio-frequency, or other signals. For example, when a user is at individual visitor computer 102, 104, 106, 108, or 109, such individual visitor computer may convert the signals to a human understandable form when sending a communication to the user and may convert input from a human to appropriate electronic, optical, radio-frequency, or other signals to be used by that computer or other computers. Likewise, when an operator is at website server computer 140, website server computer 140 may convert the signals to a human understandable form when sending a communication to the operator and may convert input from a human to appropriate electronic, optical, radio-frequency, or other signals to be used by that computer or other computers.

Before turning to the details of the method, more details regarding the individual visitor computers are given. Note that individual visitor computers 102, 104, 106, 108, and 109 may be similar or different compared to one another. The similarities or differences may be related to differences in types of the computers (personal computer, a workstation, a PDA, a cellular phone, a pager, etc.), CPU identifier (Intel x486™ class, Pentium 3™ class, Power PC 3™ class, etc.) OSs (Windows 2000™, Linux, MacOS X™ (etc.), browser applications and versions (Netscape 7.0™, Internet Explorer 6.0™, Apple Safari™, Opera 7.1™, etc.), display size (display for personal computer, PDA, cellular phone, pager, etc.), screen resolution (800×600 pixels, 1024×768 pixels), locale information (language, geographic region, time zone, etc.), installed plug-in software components mimetypes supported, whether a programming language (e.g., Java) is enabled, accessories that can be activated by a browser application, or any other information that may be transmitted by the visitor server computer 120 in providing information to the website server computer 140 in order to locate or generate a page for the individual visitor computer requesting the information.

With all this information available, the likelihood of properly distinguishing between individual visitor computers increases as the number of characteristics is considered. For example, individual visitor computer 102 may be a personal computer using a Windows 2000™ OS, Internet Explorer 6.0™ browser, have locale information corresponding to the U.S., and have a screen resolution of 800×600 pixels. Individual visitor computer 104 may be similar to individual visitor computer 102 except that Netscape 7.1™ browser and a screen resolution of 1024×768 pixels is used. Individual computer 106 may be similar to individual visitor computer 104 except that MacOS X™ OS and Apple Safari™ browser may be used. Individual computer 108 may be similar to individual visitor computer 104 except that Opera 7.1™ browser may be used. Individual computer 109 may be similar to individual visitor computer 104 except that it has a unique set of plug-in software components activated. As can be seen, each of the individual visitor computers has at least one different characteristic of the browsing environment as compared to the other individual visitor computers.

Attention is now directed to an exemplary method for using the system in order for website server computer 140 to identify more accurately an individual visitor. FIGS. 2-3 include one non-limiting, exemplary method of using the system in accordance with an embodiment of the invention. After reading this specification, skilled artisans will appreciate that many other embodiments may be used.

Referring to FIG. 2, the exemplary method can comprise sending a request for information from individual visitor computer 102, 104, 106, 108, or 109 ("requesting visitor computer") to visitor server computer 120 (block 202 in FIG. 2), sending an IP address of visitor server computer 120 and characteristics of the requesting visitor computer from visitor server computer 120 to website server computer 140 (block 222), requesting further characteristics about the requesting visitor computer (optional) (block 224), and generating a visitor identifier using the IP address and any one or more of the characteristics of the requesting visitor computer (block 242). Referring to FIG. 3, the exemplary method can continue with starting session tracking using the visitor identifier (block 302), generating a page corresponding to the request (block 304), sending the page from website server computer 140 to visitor server computer 120 (block 306), forwarding the page from visitor server computer 120 to the requesting visitor computer (block 308), and ending the session (block 310).

The method will be explained in more detailed below to give a better understanding of the invention and some alternatives. Referring to FIG. 2, the method can comprise sending a request for information from the requesting visitor computer (e.g., individual visitor computer 102, 104, 106, 108, or 109) to visitor server computer 120. The request can include a Uniform Resource Locator ("URL"), an address or other identifier for requesting visitor computer that is recognized by visitor server computer 120, and one or more characteristics of the requesting visitor computer.

The characteristics may be within a header portion of a request in the Hypertext Transfer Protocol ("HTTP"). In one embodiment, the user-agent information in the user-agent string of the requesting visitor computer may be used as the characteristic. A user-agent string specification has been published by The Mozilla Organization and can be found at http://www.mozilla.org/build/revised-user-agent-string-s.html. The user-agent string specification is incorporated herein by reference. The user-agent information can include the browser application and version and compatibility information regarding the browser application. For example, the user-agent information may include Internet Explorer 6.0™ browser that is also compatible with an Internet Explorer 5.x™ browser or Internet Explorer 4.x™ browser. In another example, the user-agent information may include Opera 7.1™ browser that is also compatible with an Internet Explorer 6.x™ Internet Explorer 5.x™, Netscape 6.x™ or Netscape 4.7™ browser.

Additional user-agent information may include the type of computer, OS, CPU identifier, locale information, a display size, or a resolution setting, or the like. In addition to the user-agent information, other information in the header of the request may be used.

Note that the content within the user-agent string may vary depending on the browser and configuration of the requesting visitor computer. Therefore, some of the attributes previously listed as potentially being within the user-agent string (e.g., OS, locale information) may not be within the user-agent string but may still be present elsewhere within the header portion of the request. Such information may include mimetypes supported, installed plug-in software components, accessories that can be activated by a browser application, or whether a specific programming language (e.g., Java) is enabled.

Note that the information regarding the requesting visitor computer may be needed or useful to website server computer 140 in locating or generating a page for the requesting visitor computer. Note that the information does not have to be used by website server computer 140; it may be provided in the ordinary course of sending requests from the requesting visitor computer.

The method can further comprise sending an IP address of visitor server computer 120 and characteristics of the requesting visitor computer from visitor server computer 120 to website server computer 160 (block 222). The actual address of requesting visitor computer may not be transmitted through the firewall 100. Visitor server computer 120 may mask the actual address of requesting visitor computer. Visitor server computer 120 may use its IP address for all requests going outside firewall 100 or may assign one IP address from a set of IP addresses. However, characteristics of the requesting visitor computer may be needed or at least be helpful in locating or generating a page by website server computer 160. Therefore, the characteristics of the requesting visitor computer can be sent from visitor server computer 120 and received by website server computer 140 via external network 130.

Optionally, website server computer 140 may request additional information regarding the characteristics about the requesting visitor computer beyond the information in the request from the visitor server computer. The request from website server computer 140 may be sent via external network to visitor server computer 120. An example of the characteristic of the requesting visitor computer may include a CPU identifier for the CPU used by the requesting visitor computer if it was not provided with the request from visitor server computer 120. Other characteristics may include other hardware or firmware configurations of the requesting visitor computer. The ability to identify more accurately requesting visitor computers generally increases as more characteristics are used by website server computer 140.

Website server computer 140 can generate a visitor identifier using the IP address and any one or more of the characteristics of the requesting visitor computer (block 242). Note that the IP address will be the IP address as provided by visitor server computer 140, rather than the actual address of the requesting visitor computer. Website server computer 140 can take the header portion from the request and parse it to determine the characteristics of the requesting visitor information. Note that some of the information for the characteristics may not be transmitted within the header portion of the request and may be obtained by website server computer 140 requesting additional information regarding the requesting visitor computer as previously described.

At website server computer 140, a visitor identifier generator software component within HD 148 may be loaded into RAM 146 and be executed by CPU 142. CPU 142 may be able to take the inputs from the IP address and any one or more of the characteristics of the requesting visitor computer and execute the instructions of the visitor identifier generator software component to generate a visitor identifier. The visitor identifier may be a composite key of nearly any length in size and can include nearly any type of character (alphabetic, numerical, punctuation or other ASCII characters, or combinations thereof). In one implementation, the composite key corresponding to the visitor identifier may be generated using concatenation of the information, a hashing function, combination thereof, or the like. The actual implementation selected is not critical and can vary based upon the desires of the operator of website server computer 140. After a visitor identifier is generated, the visitor identifier may be cached within RAM 146, stored onto HD 148, or transmitted to database 160.

Many different subsequent actions may be taken at this point in the method. The following is one of many different applications for using the visitor identifier. For example the visitor identifier may be compared to existing visitor identifiers within database 160 to determine if the same visitor identifier has been used at website server computer 140.

The method can further comprise starting session tracking using the visitor identifier (block 302 in FIG. 3). A web log may be used to keep track of the pages that the visitor requests during the same session. After receiving the request, the method can further comprise generating a page corresponding to the request (block 304). Web server computer 140 can generate and customize the page for the requesting visitor computer by using the characteristics that originated from the requesting visitor computer.

The method can still further comprise sending the page from website server computer 140 to visitor server computer 120 (block 306). After receiving the page from website server computer 140, visitor server computer 120 matches the page to the requesting visitor computer. The method can also comprise forwarding the page from visitor server computer 120 to the requesting visitor computer (block 308). The process of making additional requests from the same requesting visitor computer, whether the same or different, can be iterated any number of times during a single session. At the end of the session, the method can comprise ending the session (block 310).

Some advantages of the method and system are noted. Even if all requests from individual visitor computers 102, 104, 106, 108, and 109 are designated with the same IP address when their requests are sent from visitor server computer 120 to website server computer 140, the different characteristics of the individual visitor computers 102, 104, 106, 108, and 109 may be detected. Each individual visitor computer 102, 104, 106, 108, or 109 may have its own unique combination of an IP address and characteristics. Therefore, each of the individual visitor computers 102, 104, 106, 108, and 109 can have its own visitor identifier without the use of a cookie or the actual address for such individual visitor computer. The method can use information as simple as an IP address and user-agent information in the user-agent string. Alternatively, additional characteristics can be determined from the request, if present.

The information used for generating the visitor identifier can be the same information that is used to locate and generate pages in response to requests even if cookies or the actual address of individual visitor computer 102, 104, 106, 108, or 109 is used or available. Therefore, additional unnecessary information is not being collected by visitor server computer 120 or transmitted between visitor server computer 120 and website server computer 140. The amount of computer resources needed to generate and use the visitor identifier in nearly all embodiments should be insignificant.

Even if further a request for characteristics of the requesting visitor computer is made by website server computer 140, the added traffic is expected to be insignificant, as relatively small portions of ASCII or similar text may be transmitted, as opposed to a long text document (over 100 Kb long) or video or image files that are also transmitted over network 110 and 130.

Figure 4:
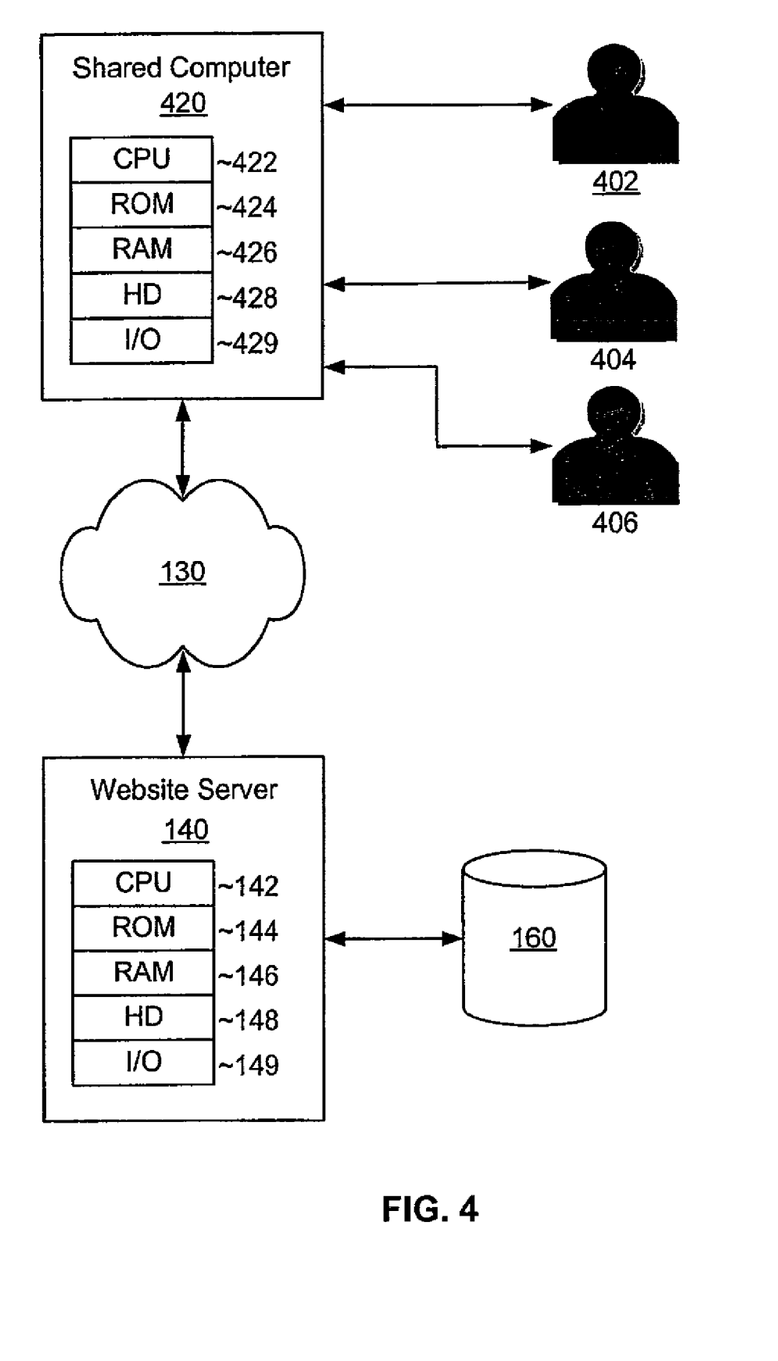
FIG. 4 includes an illustration of a network system including a shared computer coupled to an external server computer via an external network, wherein the system includes a software component with code having instructions in accordance with an embodiment of the invention.

Another alternative hardware configuration can be seen in FIG. 4. FIG. 4 includes a shared computer 420 that may be used by a number of different users 402, 404, and 406. Shared computer 420 includes a CPU 422, ROM 424, RAM 426, HD 428, and I/O 429. Shared computer 420 may allow different individual accounts for the different users. In this configuration, the same computer, OS, browser application and version may be used. However, the different users may have different resolution settings, different configurations of plug-in software components activated, or other differences. Therefore, each individual user account may result in different characteristics for each of users 402, 404, and 406 even though they may use the same computer, OS, browser application and version. As long as at least one characteristic is different between users 402, 404, and 406, website server computer 140 can distinguish between the different users 402, 404, and 406. Note that from the perspective of website server computer 140, the type of information received by website server computer 140 over external network 130 in FIG. 4 may not appear any different from the type of information received from the configuration shown in FIG. 1.

In still another alternative embodiment, the method can also be implemented in a configuration where a single user at single computer (not shown) is coupled to the website server computer 140 via external network 130. Therefore, the method is flexible to handle a wide variety of configurations.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method for visitor identification on the Internet using information a website server computer regularly receives, the method comprising:
   receiving, by a website server computer hosting a website on the Internet, a request from a gateway computer operating in a network computing environment, the request containing a Uniform Resource Locator (URL) referencing the website on the Internet, an Internet Protocol (IP) address on the gateway computer, and a header;
   generating a composite key using only the IP address on the gateway computer and information within the header of the request from the gateway computer, the header containing characteristics of a visitor computer operating within a firewall of the network computing environment, the characteristics of the visitor computer including a unique set of software components activated on the visitor computer, the unique set of software components distinguishing a user account on the visitor computer from a plurality of user accounts on the visitor computer and from a plurality of visitor computers in the network computing environment;
   generating or locating a page using same information that is used by the website server computer in generating the composite key; and
   sending the page from the website server computer to the gateway computer operating in the network computing environment, the gateway computer forwarding the page to the visitor computer through the firewall of the network computing environment.

2. The method according to claim 1, further comprising:
   starting a session using the composite key generated by the website server computer;
   using the composite key and a web log to keep track of pages that the visitor computer requests during the session; and
   ending the session when a user associated with the visitor computer leaves the website or when inactivity from the user at the website exceeds a predetermined time period.

3. The method according to claim 1, further comprising:
   caching the composite key on the website server computer;
   storing the composite key in a non-transitory computer-readable medium of the website server computer; or
   transmitting the composite key to a database accessible by the website server computer.

4. The method according to claim 3, further comprising:
   comparing the composite key with existing composite keys within the database;
   determining whether the composite key has been used at the website server computer; and
   if the composite key has not been used at the website server computer, storing the composite key in the database.

5. The method according to claim 1, wherein the composite key comprises alphabetic characters, numerical characters, punctuation, American Standard Code for Information Interchange (ASCII) characters, or combinations thereof.

6. The method according to claim 1, further comprising:
receiving a plurality of requests from the gateway computer operating in the network computing environment, each request of the plurality of requests containing a URL referencing the website on the Internet, the IP address on the gateway computer, and a header containing characteristics of a visitor computer of the plurality of visitor computers in the network computing environment, each visitor computer of the plurality of visitor computers having a unique combination of the IP address on the gateway computer and characteristics of the each visitor computer.

7. The method according to claim 6, further comprising, for each visitor computer of the plurality of visitor computers:
generating a composite key using a unique combination of the IP address on the gateway computer and any one or more of the characteristics of the each visitor computer; and
generating or locating a page using same information that is used by the website server computer in generating the composite key.

8. A website server computer, comprising:
a processor;
a non-transitory computer-readable medium; and
stored instructions translatable by the processor for performing:
receiving a request from a gateway computer operating in a network computing environment, the request containing a Uniform Resource Locator (URL) referencing a website hosted by the website server computer, an Internet Protocol (IP) address on the gateway computer, and a header;
generating a composite key using only the IP address on the gateway computer and information within the header of the request from the gateway computer, the header containing characteristics of a visitor computer operating within a firewall of the network computing environment, the characteristics of the visitor computer including a unique set of software components activated on the visitor computer, the unique set of software components distinguishing a user account on the visitor computer from a plurality of user accounts on the visitor computer and from a plurality of visitor computers in the network computing environment;
generating or locating a page using same information that is used in generating the composite key; and
sending the page to the gateway computer operating in the network computing environment, the gateway computer forwarding the page to the visitor computer through the firewall of the network computing environment.

9. The website server computer of claim 8, wherein the stored instructions are further translatable by the processor for performing:
starting a session using the composite key generated by the website server computer;
using the composite key and a web log to keep track of pages that the visitor computer requests during the session; and
ending the session when a user associated with the visitor computer leaves the website or when inactivity from the user at the website exceeds a predetermined time period.

10. The website server computer of claim 8, wherein the stored instructions are further translatable by the processor for performing:
caching the composite key on the website server computer;
storing the composite key on the non-transitory computer-readable medium of the website server computer; or
transmitting the composite key to a database accessible by the website server computer.

11. The website server computer of claim 10, wherein the stored instructions are further translatable by the processor for performing:
comparing the composite key with existing composite keys within the database;
determining whether the composite key has been used at the website server computer; and
if the composite key has not been used at the website server computer, storing the composite key in the database.

12. The website server computer of claim 11, wherein the composite key comprises alphabetic characters, numerical characters, punctuation, American Standard Code for Information Interchange (ASCII) characters, or combinations thereof.

13. The website server computer of claim 8, wherein the stored instructions are further translatable by the processor for performing:
receiving a plurality of requests from the gateway computer operating in the network computing environment, each request of the plurality of requests containing a URL referencing the website on the Internet, the IP address on the gateway computer, and a header containing characteristics of a visitor computer of the plurality of visitor computers in the network computing environment, each visitor computer of the plurality of visitor computers having a unique combination of the IP address on the gateway computer and characteristics of the each visitor computer.

14. The website server computer of claim 13, wherein the stored instructions are further translatable by the processor for performing, for each visitor computer of the plurality of visitor computers:
generating a composite key using a unique combination of the IP address on the gateway computer and any one or more of the characteristics of the each visitor computer; and
generating or locating a page using same information that is used by the website server computer in generating the composite key.

15. A computer program product comprising a non-transitory computer readable medium storing instructions translatable by a processor of a website server computer to perform:
receiving a request from a gateway computer operating in a network computing environment, the request containing a Uniform Resource Locator (URL) referencing a website hosted by the website server computer, an Internet Protocol (IP) address on the gateway computer, and a header;
generating a composite key using only the IP address on the gateway computer and information within the header of the request from the gateway computer, the header containing characteristics of a visitor computer operating within a firewall of the network computing environment, the characteristics of the visitor computer including a unique set of software components activated on the visitor computer, the unique set of software components distinguishing a user account on the visitor computer from a plurality of user accounts on the visitor computer and from a plurality of visitor computers in the network computing environment;

generating or locating a page using same information that is used in generating the composite key; and sending the page to the gateway computer operating in the network computing environment, the gateway computer forwarding the page to the visitor computer through the firewall of the network computing environment.

16. The computer program product of claim 15, wherein the instructions are further translatable by the processor for performing:

starting a session using the composite key generated by the website server computer;

using the composite key and a web log to keep track of pages that the visitor computer requests during the session; and ending the session when a user associated with the visitor computer leaves the website or when inactivity from the user at the website exceeds a predetermined time period.

17. The computer program product of claim 15, wherein the instructions are further translatable by the processor for performing:

caching the composite key on the website server computer;

storing the composite key on the non-transitory computer-readable medium of the website server computer; or transmitting the composite key to a database accessible by the website server computer.

18. The computer program product of claim 17, wherein the instructions are further translatable by the processor for performing:

comparing the composite key with existing composite keys within the database;

determining whether the composite key has been used at the website server computer; and if the composite key has not been used at the website server computer, storing the composite key in the database.

19. The computer program product of claim 15, wherein the instructions are further translatable by the processor for performing:

receiving a plurality of requests from the gateway computer operating in the network computing environment, each request of the plurality of requests containing a URL referencing the website on the Internet, the IP address on the gateway computer, and a header containing characteristics of a visitor computer of the plurality of visitor computers in the network computing environment, each visitor computer of the plurality of visitor computers having a unique combination of the IP address on the gateway computer and characteristics of the each visitor computer.

20. The computer program product of claim 19, wherein the instructions are further translatable by the processor for performing, for each visitor computer of the plurality of visitor computers:

generating a composite key using a unique combination of the IP address on the gateway computer and any one or more of the characteristics of the each visitor computer; and generating or locating a page using same information that is used by the website server computer in generating the composite key.

* * * * *